United States Patent [19]

Michel

[11] Patent Number: 5,061,073

[45] Date of Patent: Oct. 29, 1991

[54] PHOTOELECTRIC POSITION MEASURING ARRANGEMENT

[75] Inventor: Dieter Michel, Traunstein, Fed. Rep. of Germany

[73] Assignee: Dr. Johannes Heidenhain GmbH, Traunreut, Fed. Rep. of Germany

[21] Appl. No.: 418,496

[22] Filed: Oct. 10, 1989

[30] Foreign Application Priority Data

Oct. 12, 1988 [DE] Fed. Rep. of Germany ....... 3834676

[51] Int. Cl.⁵ .................. G01B 11/02; G01B 11/26
[52] U.S. Cl. .................................... 356/374; 33/707
[58] Field of Search ............... 356/356, 374; 33/707; 250/237 G

[56] References Cited

U.S. PATENT DOCUMENTS

| 2,886,718 | 5/1959 | Shepherd et al. | 250/237 G |
| 4,195,909 | 4/1980 | Holle et al. | 250/237 G |
| 4,459,750 | 7/1984 | Affa | 250/237 G |
| 4,479,716 | 10/1984 | Nelle | 356/374 |
| 4,677,293 | 6/1987 | Michel | 356/374 |
| 4,766,310 | 8/1988 | Michel | 250/237 G |
| 4,776,701 | 10/1988 | Pettigrew | 356/356 |

FOREIGN PATENT DOCUMENTS

| 0163362 | 12/1985 | European Pat. Off. . |
| 3416864 | 11/1985 | Fed. Rep. of Germany . |
| 3509102 | 1/1987 | Fed. Rep. of Germany . |

Primary Examiner—Richard A. Rosenberger
Attorney, Agent, or Firm—Willian Brinks Olds Hofer Gilson & Lione

[57] ABSTRACT

A position measuring arrangement is provided which presents a graduation carrier with graduation and reference mark fields to a scanning plate. A prism is allocated to one of the measuring graduation fields and reference mark fields. The prism provides an optical separation of the measuring graduation and reference mark fields transversely to the measuring direction.

15 Claims, 2 Drawing Sheets

PHOTOELECTRIC POSITION MEASURING ARRANGEMENT

BACKGROUND OF THE INVENTION

The present invention relates generally to a length or angle measuring arrangement and more particularly to a length or angle measuring arrangement which includes a graduation carrier including a measuring graduation and reference mark fields.

Devices for generating photoelectric electrical signals in length or angle measuring arrangements are known in the art. For example, a position measuring arrangement of this type is disclosed in German DE-C2-3416864. This reference discusses the problems which are peculiar to the generation of reference impulses in such position measuring arrangements and suggest possible solutions to such problems. In the disclosed device, the arrangement of the photodetectors is governed by the wavelength of the light as well as by the orientation of the grid parameters of the phase grids.

However in such arrangements the measuring result may be impaired for example through refracted partial beam bundles of higher order which impinge or fall upon detectors that are allocated or dedicated to other partial beam bundles which are of lower order. Further, if there are geometric and/or optical changes in the measuring arrangement, errors can occur if the individual allocations described above are deviated from further.

Therefore, in view of the above, it is a primary object of the present invention to provide a scanning arrangement wherein a reference mark is scanned in a high-resolution position measuring arrangement having a very large scanning space in relation to the resolution of the measuring graduation of the arrangement.

It is a further object of the present invention to provide a measuring arrangement which is insensitive to tilting, turning, scanning-distance changes, aging of the light source, and other interfering factors to thereby provide a clear allocation of the reference marks to the scanning graduation which remain constantly preserved.

SUMMARY OF THE INVENTION

To achieve the foregoing and other objects of the present invention, a device for the photoelectric generation of electrical signals for use in length or angle measuring arrangements is provided. The arrangement includes at least one illuminating arrangement, a graduation carrier having graduation markings having several fields for measuring graduation marks and reference marks, a scanning plate having several scanning fields for the graduation markings, several photodetectors and an evaluating circuit. The device is configured such that at least individual graduation markings are formed as phase grids. The photodetectors are provided to detect the radiation defracted by the graduation markings which depends on the wavelength of the radiation, and on the orientation and the grid parameters of the graduation markings. Advantageously, the scanning fields for measuring graduation and reference mark fields are arranged substantially symmetrically to the optical axis of the illuminating arrangement. Means are provided for deflecting optically transversely to the measuring direction for providing optical separation of the scanning beam paths of the measuring graduation and reference marks. Preferably the optically deflecting means is allocated to one of the measuring graduation scanning fields and the reference mark scanning fields of the scanning plate.

The arrangement of the present invention has the advantages that the arrangement is insensitive with respect to the interfering factors which are discussed above. Accordingly, the measuring arrangement clearly operates at a much higher level of reliability in its long-term behavior as well as in the attainable relationship of the resolution to the scanning distance.

Additional objects, advantages, and novel features of the invention will be set forth in part in the description which follows, and in part will become apparent to those skilled in the art upon examination of the following description or may be learned by practice of the invention. The objects and advantages of the invention may be obtained by means of the combinations particularly pointed out in the appended claims.

DETAILED DESCRIPTION OF THE PRESENTLY PREFERRED EMBODIMENTS

Figure 1:
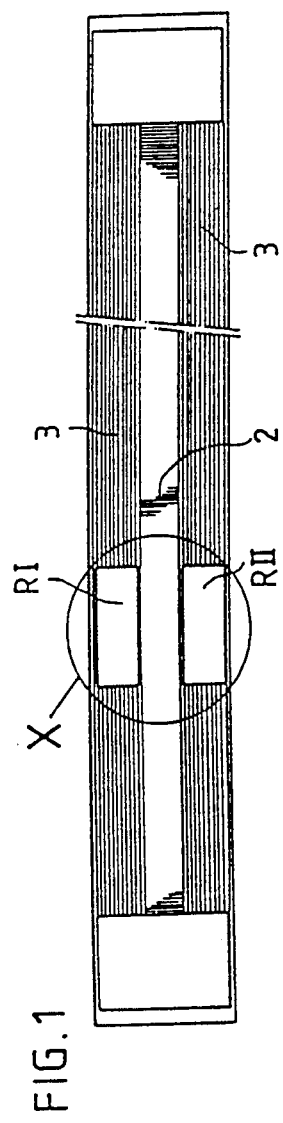
FIG. 1 illustrates a preferred embodiment of the graduation carrier of the present invention.

Referring now specifically to the drawings and particularly to FIG. 1, a preferred embodiment of the graduation carrier according to the present invention is illustrated. The graduation carrier is fastened in a manner known in the art and therefore not further specified (not represented) to one of the objects whose position is to be measured. The graduation carrier 1 carries a measuring graduation 2, which is preferably constructed as a phase grid. The graduation carrier preferably has a graduation period of $8\mu$ (microns). A surrounding-field graduation 3 extends along each side of the measuring graduation 2. The surrounding-field graduation 3 is also preferably constructed as a phase grid. Preferably the phase grid of the surrounding-field graduation 3 has a $15\mu$ graduation. In the preferred embodiment illustrated, the grid lines of this surrounding-field graduation 3 preferably run perpendicularly to the grid lines of the measuring graduation 2.

In an exposed location—the so-called calibration or reference point of the measuring graduation—a reference mark RI or two reference marks RI and RII are arranged within the surrounding-field graduation 3.

Figure 2:
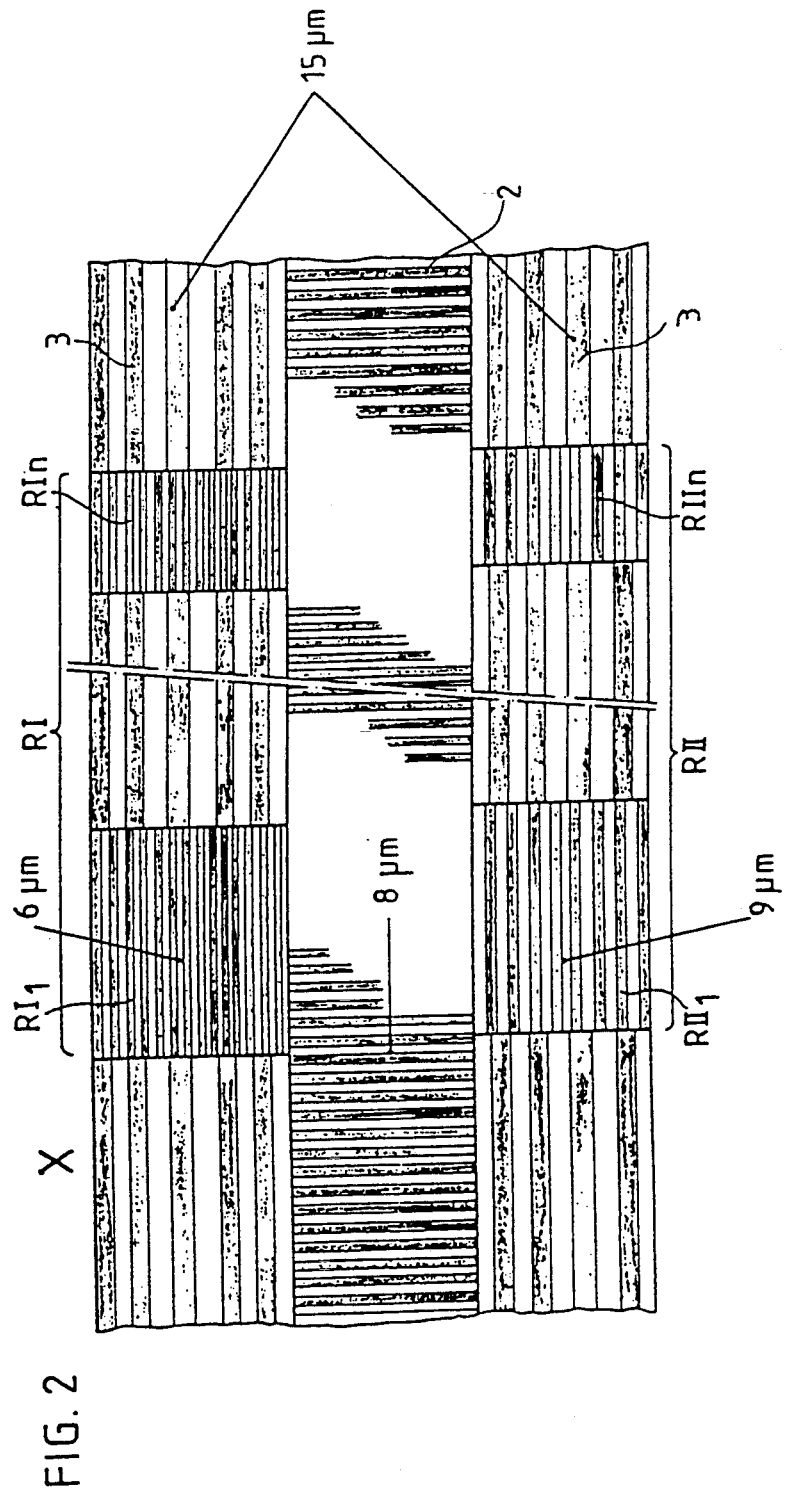
FIG. 2 illustrates a cut-out of the enlargement labeled X in FIG. 1.

Referring now to FIG. 2, an enlarged representation of the detail X illustrated in FIG. 1 is illustrated. Reference marks are typically used for the calibration of incremental measuring systems because a reference point of the incremental measuring graduation can be reproduced at any time due to the absolutely fixed position of the reference marks with respect to the measuring graduation. The reference marks RI and RII preferably comprise a number of fields $RI_{1...n}$ and $RII_{1...n}$, which are arranged within the surrounding-field graduation 3 in a predetermined manner. Specifically, the manner in which the reference marks are arranged is disclosed in U.S. Pat. No. 4,677,293 corresponding to German DE-C2-3416864 which is referred to above and which is incorporated herein by reference.

The fields $RI_{1...n}$ and $RII_{i...n}$ also have grid lines that run perpendicular to the grid lines of the measuring graduation 2. The grids of the fields $RI_{1...n}$ preferably have a graduation period of $6\mu$, and the grids of fields $RII_{1...n}$ preferably have a graduation period of $9\mu$. As best illustrated in FIG. 2 grid lines of the surrounding-field graduation 3 are provided between the fields $RI_{1...n}$ and $RII_{i...n}$ of the reference marks RI and RII.

Figure 3A:
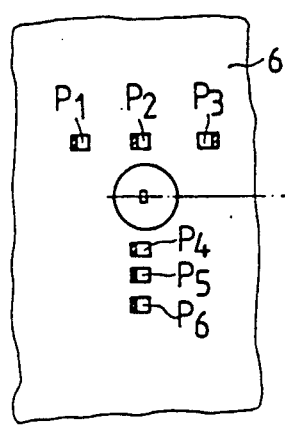
FIG. 3a illustrates a preferred embodiment of the detector plate used with the arrangement illustrated in FIG. 3.
Figure 3:
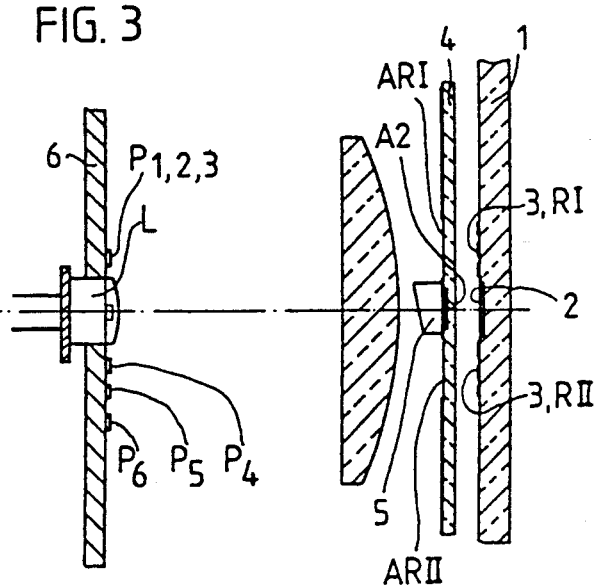
FIG. 3 illustrates a preferred embodiment of an optical arrangement of a device for the scanning of the graduation carrier illustrated in FIG. 1.

Preferably, as illustrated in FIG. 3, the reference marks RI and RII are slightly offset from one another in the measuring direction providing a special evaluation after the scanning. Such an offset mark arrangement is disclosed for example in German DE-C2-3509102. However, this reference does not disclose the specific arrangement of the reference marks of the present invention which are described above.

Figure 3B:
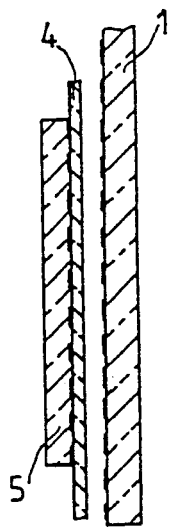
FIG. 3b illustrates a preferred embodiment of a scanning plate according to FIG. 1 with the measuring graduation carrier.

Referring now to FIGS. 3 and 3b, a scanning plate 4 is provided in the scanning arrangement for the scanning of the graduation carrier 1. Preferably the scanning plate 4 includes graduation scanning fields A2 and reference mark scanning fields ARI and ARII. These scanning fields A2, ARI and ARII are preferably arranged substantially symmetrically to the optical axis of an illuminating arrangement L. That is, the scanning field A2 is disposed such that it is divided symmetrically about the optical axis of the illuminating arrangement L and the scanning fields ARI and ARII are disposed one on each side of the optical axis.

An optically deflecting means such as a prism 5 is disposed over the measuring graduation scanning field A2. The prism 5 deflects transversely to the measuring direction such that an optical separation of the scanning beam paths in the scanning of the measuring graduation 2 and of the reference marks RI and RII is achieved.

It will however be recognized by those skilled in the art that the scope of the invention contemplates the use of deflecting means other than the prism 5. Similarly it will be recognized that the allocation of the deflecting means to the scanning field A2 of the measuring graduation is not required. For example, the deflecting means may be allocated to the reference mark scanning fields ARI and/or ARII to provide an optical separation of the scanning beam paths. Specific implementation of these variations may be realized by those skilled in the art.

Referring now specifically to FIG. 3a, the plate 6 on which the illuminating arrangement L and photodetectors $P_1$ to $P_6$ is illustrated. Preferably, the photodetectors $P_1$, $P_2$ and $P_3$ are arranged horizontally in series such that the refracted partial beam bundles from the illuminating radiation fall on these three photodetectors $P_1$, $P_2$ and $P_3$ with a phase displacement in each case of 120° relative to one another. The partial beam bundles are generated through refraction on the grids as is described in U.S. Pat. No. 4,776,701 corresponding to EP-B1-0163362 which is incorporated herein by reference. The partial beam bundles are formed by the measuring graduation 2 and the appertaining scanning fields A2.

From the surrounding-field graduation 3, the refracted beam bundles are cast onto the photodetector $P_4$. The refracted partial beam bundles that have been refracted by the reference mark fields $RII_{1...n}$ and $RI_{1...n}$ are cast onto the photodetectors $P_5$ and $P_6$ in cooperation with the appertaining scanning fields ARII and ARI on the scanning plate 4.

The electrical summarizing of the signals generated by the reference marks RI and RII be implemented in a manner known in the art, for example in the manner disclosed in DE-C2-3509102.

It will be recognized by those skilled in the art that the periods of the grids mentioned above have proved suitable in actual practice, but obviously the invention is not restricted to the particular relationships disclosed and other variations are possible depending on the use contemplated.

Therefore, the present invention provides an arrangement which is insensitive to interfering factors such as tilting, turning, scanning-distance change, aging of the light source and other interfering factors. The device of the present invention achieves a higher operating reliability in long-term behavior. Additionally, the device of the present invention attains a higher operating reliability in relation of the resolution, for example $4\mu$, to the scanning distance, for example, $2500\mu$.

The foregoing description of the preferred embodiments of the present invention has been presented for purposes of illustration and description. The embodiments are not intended to be exhaustive or to limit the invention to the precise forms disclosed, and obviously many modifications and variations are possible in light of the above teachings. It is intended that the scope of the invention be defined by the following claims, including all equivalents.

I claim:

1. An apparatus for the photoelectric generation of electrical signals in a length or angle measuring arrangement, the measuring arrangement having at least one illuminating device, a graduation carrier having measuring graduations defined by measuring graduation markings and reference marks having reference graduation markings, a plurality of fields for measuring the measuring graduation markings and reference graduation markings a scanning plate having a plurality of scanning fields for the graduation markings, a plurality of photodetectors and an evaluating circuit, wherein at least the individual graduation markings are formed as phase grids, and wherein the photodetectors detect the radiation diffracted by the graduation markings depending on: (1) the wavelength of the radiation, (2) the orientation and (3) the grid parameters of the markings, the improvement comprising:

the scanning fields for measuring graduation and reference mark fields being arranged substantially symmetrically about the optical axis of the illuminating device, wherein the measuring graduation markings have a different orientation than the reference graduation markings, and the apparatus further comprises means for deflecting optically transversely to the measuring direction for providing optical separation of the radiation diffracted from the measuring graduation and the radiation diffracted from the reference marks.

2. The apparatus according to claim 1 wherein the optically deflecting means is allocated to one of (1) the measuring graduation fields, and (2) the reference mark scanning fields of the scanning plate.

3. The apparatus according to claim 2 wherein the optically deflecting means comprises a prism.

4. The apparatus according to claim 1 wherein at least one of the measuring graduation and the reference marks formed by the reference mark fields comprise phase grids.

5. The apparatus according to claim 1 wherein the reference marks are surrounded by a surrounding-field graduation.

6. The apparatus according to claim 5 wherein the grid lines of the reference marks and of the surrounding-field graduation have the same spatial orientation and wherein the grid lines of the reference marks and of the surrounding-field graduation have different graduation periods.

7. The apparatus according to claim 1 wherein the reference marks on the graduation carrier are offset relative to one another in the measuring direction.

8. The apparatus according to claim 1 wherein the measuring graduation markings are disposed perpendicular to the reference graduation markings.

9. An apparatus for the photoelectric generation of electrical signals in a length or angle measuring arrangement, the measuring arrangement having at least one illuminating device, a graduation carrier having measuring graduation defined by measuring graduation markings and reference marks having reference graduation markings, a plurality of fields for measuring the measuring graduation markings and reference graduation markings, a scanning plate having a plurality of scanning fields for the graduation markings, a plurality of photodetectors and an evaluating circuit, wherein at least the individual graduation markings are formed as phase grids, and wherein the photodetectors detect the radiation diffracted by the graduation markings depending on (1) the wavelength of the radiation, (2) the orientation, and (3) the grid parameters of the markings, the improvement comprising:

the scanning fields for measuring graduation and reference mark fields being arranged substantially symmetrically about the optical axis of the illuminating device, wherein the measuring graduation markings have a different orientation than the reference graduation markings, and the apparatus further comprises means for deflecting optically transversely to the measuring direction for providing optical separation of the radiation diffracted from the measuring graduation and the radiation diffracted from the reference marks, the optically deflecting means being allocated to one of: (1) the measuring graduation fields, and (2), the reference mark scanning fields of the scanning plate.

10. The apparatus according to claim 9 wherein the optically deflecting means comprises a prism.

11. The apparatus according to claim 9 wherein at least one of the measuring graduation and the reference marks formed by the reference mark fields comprise phase grids.

12. The apparatus according to claim 9 wherein the reference marks are surrounded by a surrounding-field graduation.

13. The apparatus according to claim 9 wherein the grid lines of the reference marks and of the surrounding-field graduation have the same spatial orientation and wherein the grid lines of the reference marks and of the surrounding-field graduation have different graduation periods.

14. The apparatus according to claim 9 wherein the reference marks on the graduation carrier are offset relative to one another in the measuring direction.

15. The apparatus according to claim 9 wherein the measuring graduation markings are disposed perpendicular to the reference graduation markings.

* * * * *